(12) United States Patent
Stewart et al.

(10) Patent No.: US 6,801,187 B2
(45) Date of Patent: Oct. 5, 2004

(54) SYSTEM AND METHOD OF INTERACTIVE EVALUATION AND MANIPULATION OF A GEOMETRIC MODEL

(75) Inventors: Paul Joseph Stewart, Ann Arbor, MI (US); Pietro Buttolo, Dearborn, MI (US); Yifan Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 639 days.

(21) Appl. No.: 09/888,120

(22) Filed: Jun. 22, 2001

(65) Prior Publication Data

US 2003/0011561 A1 Jan. 16, 2003

(51) Int. Cl.[7] ............................................. G09G 5/00
(52) U.S. Cl. ..................................... 345/156; 345/702
(58) Field of Search ................................ 345/156, 157, 345/161, 167, 420, 701, 702; 700/29, 182

(56) References Cited

U.S. PATENT DOCUMENTS

| | | | |
|---|---|---|---|
| 5,459,382 A | * 10/1995 | Jacobus et al. | ........ 318/568.11 |
| 5,629,594 A | 5/1997 | Jacobus et al. | |
| 5,631,861 A | 5/1997 | Kramer | |
| 5,694,013 A | 12/1997 | Stewart et al. | |
| 5,731,816 A | 3/1998 | Stewart et al. | |
| 5,792,031 A | 8/1998 | Alton | |
| 5,793,382 A | 8/1998 | Yerazunis et al. | |
| 5,802,353 A | 9/1998 | Avila et al. | |
| 5,831,408 A | 11/1998 | Jacobus et al. | |
| 5,831,584 A | 11/1998 | Socks et al. | |
| 5,844,392 A | 12/1998 | Peurach et al. | |
| 5,846,086 A | 12/1998 | Bizzi et al. | |
| 5,903,458 A | 5/1999 | Stewart et al. | |
| 5,921,780 A | 7/1999 | Myers | |
| 5,930,155 A | 7/1999 | Tohi et al. | |
| 5,963,891 A | 10/1999 | Walker et al. | |
| 6,036,345 A | 3/2000 | Jannette et al. | |
| 6,037,945 A | 3/2000 | Loveland | |
| 6,084,587 A | 7/2000 | Tarr et al. | |
| 6,084,590 A | 7/2000 | Robotham et al. | |
| 6,104,158 A | * 8/2000 | Jacobus et al. | ........ 318/568.11 |
| 6,111,577 A | 8/2000 | Zilles et al. | |
| 6,253,167 B1 | 6/2001 | Matsuda et al. | |
| 6,262,738 B1 | * 7/2001 | Gibson et al. | .............. 345/419 |
| 6,273,724 B1 | 8/2001 | Roytman | |
| 2002/0000996 A1 | 1/2002 | Trika | |
| 2002/0133264 A1 | * 9/2002 | Maiteh et al. | .............. 700/182 |
| 2002/0140633 A1 | 10/2002 | Rafii et al. | |
| 2002/0163497 A1 | * 11/2002 | Cunningham et al. | ...... 345/156 |
| 2003/0134676 A1 | 7/2003 | Kang | |

OTHER PUBLICATIONS

Artificial Intelligence (Understanding Computers), by Time–Life Books, 1986, ISBN 0–8094–5675–3, pp. 36–43.
Juran on Quality by Design, by J.M. Juran, The Free Press, 1992, ISBN 0–02–916683–7, pp. 406–427, and 462–467.
The Computer Science and Engineering Handbook, by Allen B. Tucker, CRC Press, ISBN: 0–8493–2909–4, 1996, p. 1954.

* cited by examiner

Primary Examiner—Richard Hjerpe
Assistant Examiner—Ronald Laneau
(74) Attorney, Agent, or Firm—David B. Kelley

(57) ABSTRACT

A system and method of interactive evaluation and manipulation of a geometric model is provided. The system includes a computer system and a haptic interface operatively in communication with the computer system, whereby the haptic interface includes a haptic end effector device for transmitting information between a user and a geometric model as the user browses or edit the surface of the geometric model using the haptic end effector device.

20 Claims, 5 Drawing Sheets

SYSTEM AND METHOD OF INTERACTIVE EVALUATION AND MANIPULATION OF A GEOMETRIC MODEL

BACKGROUND OF THE INVENTION

1. Field of the Invention

The present invention relates generally to computer-assisted design of vehicles and, more specifically, to a system and method of interactive evaluation and manipulation of a geometric model in the computer-assisted design of a vehicle.

2. Description of the Related Art

Vehicle design, and in particular the design of an automotive vehicle, has advanced to a state in which computer-assisted design techniques are frequently incorporated in the development of a new vehicle or redesign of an existing vehicle. Enhanced visualization software tools allow for interactive display and manipulation of large geometric models, including models developed using computer aided design (CAD). In the field of vehicle design, the use of computer aided design and visualization techniques are especially beneficial in designing, packaging, and assembling the various systems incorporated within the vehicle to maximize the design and functional capabilities of these vehicles. Advantageously, potential vehicle system designs can be considered in a timely and cost-effective manner by analyzing a digital representation of a proposed design versus preparing an actual vehicle model.

One aspect of the design task for a vehicle is the coexistence of a CAD generated geometric model and a physical model. An advantage of the physical model is that it provides a physical representation of the design that can be evaluated visually and by touch. For example, a clay model allows a designer to assess a surface quality of the model through multi-fingered, two handed, dexterous manipulation of the model. Designers often trace the contour of a vehicle surface with their fingertips and palm to obtain tactile information to assess surface fairness. A disadvantage of the physical model relates to transforming the physical model back into the original CAD format after the designer has modified the physical model.

The geometric model of a proposed design is typically constructed using a technique such as computer-aided design (CAD). An advantage of a CAD model is that known mathematical tools, such as computer-aided engineering (CAE), are available to constrain and guide the designer in evaluating the design. In addition, the construction steps involved in creating the geometric model can be recorded for later use. The geometric model can easily be updated using the construction steps in light of a new set of parameters. A disadvantage of a CAD model relates to viewing a 3-dimensional model in 2-dimensions on a display device.

Recently, designers have utilized virtual reality simulation techniques to provide a bridge between the physical model and the CAD model. Virtual reality allows a user to interact with a virtual environment, including a virtual object in the virtual environment, as if the user was actually immersed in the virtual environment. It should be appreciated that a virtual object within the virtual environment may include a virtual surface.

A user-friendly physical device, such as a haptic device, serves as an interface between the user and the virtual environment. Advantageously, the haptic device reproduces at a high rate of speed the sensation of freely moving an object within a constrained environment by determining the forces exchanged between the interacting geometries. This process is frequently referred to as haptic rendering. An example of a haptic device is disclosed in U.S. Pat. No. 5,694,013 to Stewart et al., entitled "Force Feedback Haptic Interface for a Three-Dimensional CAD Surface", the disclosure of which is incorporated by reference.

Haptic rendering provides the user with information regarding the virtual surface using force feedback from a single point of contact. In particular, haptic browsing refers to the tactile interaction and visualization of the geometric surface using a haptic interface. An example of a methodology of haptic browsing is disclosed in U.S. Pat. No. 5,844,392 to Peurach et al., entitled "Haptic Browsing", the disclosure of which is incorporated by reference. While the method disclosed by Peurach et al. '392 uses haptics to present information regarding a single point, it does not constrain the haptic interface to the surface of the geometric model to convey kinesthetic or tactile information.

Haptic sculpting is a recent technique providing a bridge between a geometric model and a physical prototype. In haptic sculpting, a user manipulates a free-form surface in the geometric model, similar to a designer using a tool to modify the shape of the surface of a physical model. A designer working with a CAD model typically moves a control point on a free form surface, such as a NURBS surface, back and forth until the desired geometric properties are obtained. Examples of geometric properties include fairness, smoothness and $C^0$, $C^1$, and $C^2$ continuity, as is known in the art. However, to achieve the desired shape, the designer still needs to alternate back and forth between different control points as changes ripple across the surface due to the mathematical properties of free-form surfaces. Preferably, haptic sculpting allows a user to sculpt an entire section of the surface with a single sweeping motion, continuously and autonomously changing the set of controlled control points, so as to achieve the desired sculpted form of the surface.

Previous haptic sculpting approaches have not constrained the haptic interface to the virtual surface and the virtual surface to the haptic interface during exploration and manipulation of the surface. Thus, there is a need in the art for a system and method of interactive evaluation of a geometric model using a haptic interface constrained to follow a surface contour of a virtual surface within the virtual environment, while the surface is simultaneously constrained to follow the user's motion.

SUMMARY OF THE INVENTION

Accordingly, the present invention is a system and method of interactive evaluation and manipulation of a geometric model. The system includes a computer system having a memory, a processor, a user input device and a display device. The system also includes a computer generated geometric model stored in the memory of the computer system. The system further includes a haptic interface operatively in communication with the computer system, wherein the haptic interface includes a haptic end effector device for transmitting information between a user and the geometric model as the user browses or edits the surface of the geometric model using the haptic end effector device.

In addition, the present invention is a method of interactive evaluation and manipulation of a geometric model including the steps of browsing a surface of the geometric model using a haptic end effector device, determining if a user is signaling to edit the surface of the geometric model, and continuing to browse the surface of the geometric model if the user is not signaling to edit the surface of the model. The method also includes the steps of editing the surface of the geometric model if the user is signaling to edit the surface of the geometric model, determining and mapping a haptic end effector device position on the surface of the geometric model while editing, and identifying a closest point to edit on the surface of the geometric model to the haptic end effector device position. The method further includes the steps of editing a fixed point by determining a surface position and property of the closest point, and modifying the geometry of the surface until the closest point converges on the haptic end effector device position, and editing a non-fixed point by decomposing the haptic end effector device position into editing and browsing components. The method includes the steps of finding a new surface position on the geometric model using a previous surface position and haptic end effector device position, and modifying the geometry of the surface until the closest point converges on the haptic end effector device position. The method still further includes the steps of editing a surface property in the neighborhood of the closest point and determining and applying a stick-to-surface/stick-to-pen force and a property feedback force using the surface property in the neighborhood of the closest point to control a location and force output of the haptic end effector device.

One advantage of the present invention is that a system and method of interactive evaluation and manipulation of a geometric model is provided that constrains a user's motion to stick to a surface of a geometric model, while simultaneously controlling the surface to stick to the device. Yet another advantage of the present invention is that a system and method is provided for haptically browsing and editing the surface of the virtual model, thus allowing the user to assess a physical property of a surface, and/or manipulate the shape of the surface. Still another advantage of the present invention is that a system and method is provided that bridges between the physical model and the CAD model by allowing the user to touch and manipulate the CAD model using virtual reality technology. Still yet another advantage of the present invention is that the system and method integrates tactile feedback in a force enabled simulation to constrain physical interaction of the user to the virtual model and further constrain the model to the haptic device. A further advantage of the present invention is that the motion of the user is constrained to the virtual surface representing the geometric model to provide the user with an enhanced understanding of the geometric properties of the model. Still a further advantage of the present invention is that the user can simultaneously explore and shape the local surface properties of the geometric model, by constraining the haptic device to follow the surface contour while simultaneously manipulating the surface to follow the user's motion.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Vehicle design is achieved according to the present invention with a generic, parametric driven design process. Advantageously, this process allows for flexibility in vehicle design and engineering analysis of the design in a fraction of the time required using conventional design methods. Various computer-based tools are integrated to achieve this enormous time and expense savings, including solid modeling, parametric design, and automated studies.

Figure 1:
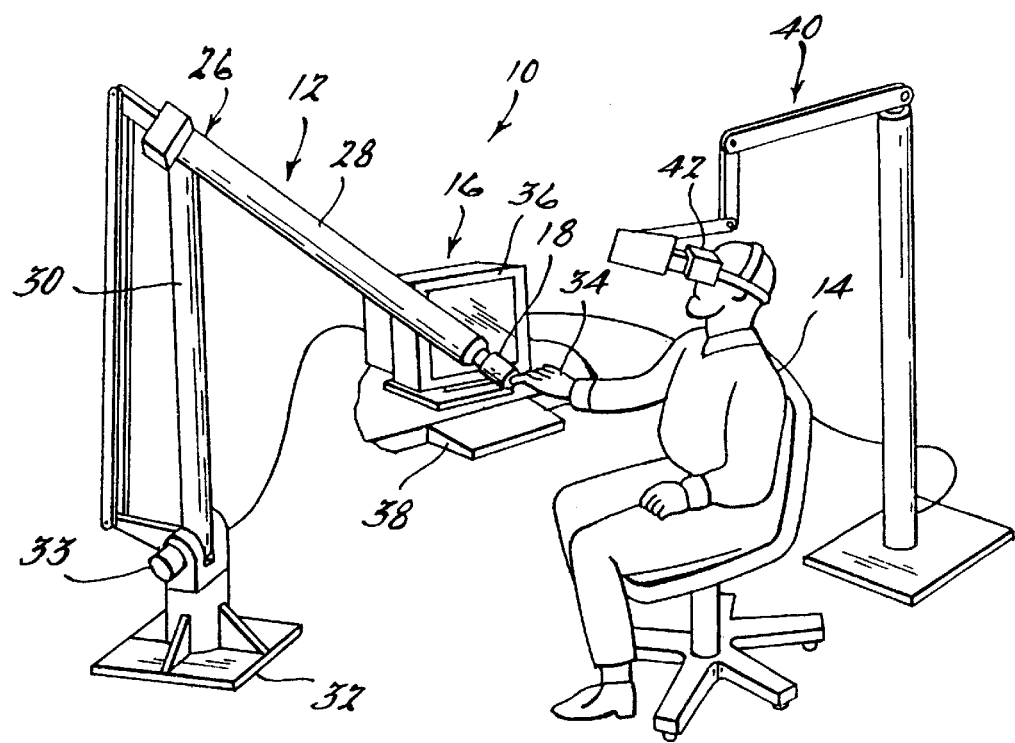
FIG. 1 is a perspective view of a system of interactive evaluation and manipulation of a geometric model, according to the present invention.
Figure 2:
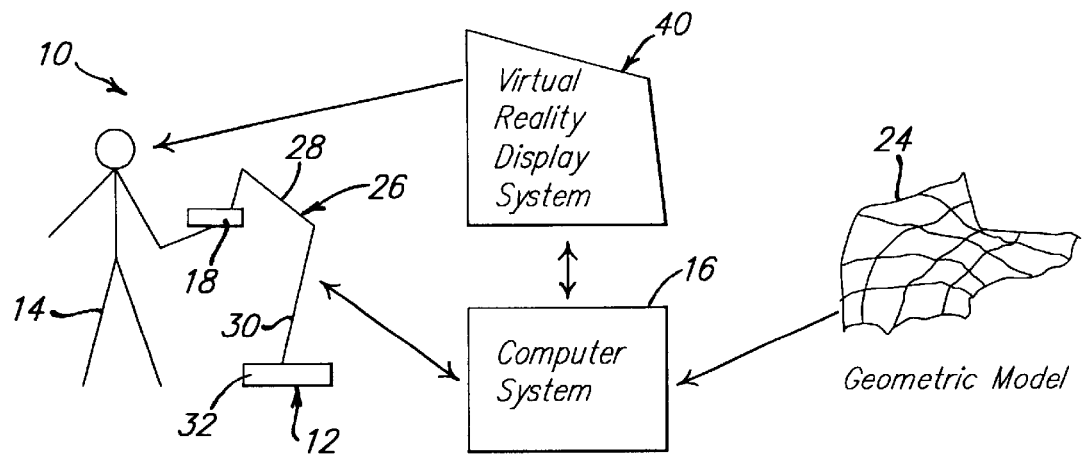
FIG. 2 is a diagrammatic view of the system of interactive evaluation and manipulation of a geometric model of FIG. 1.
Figure 3:
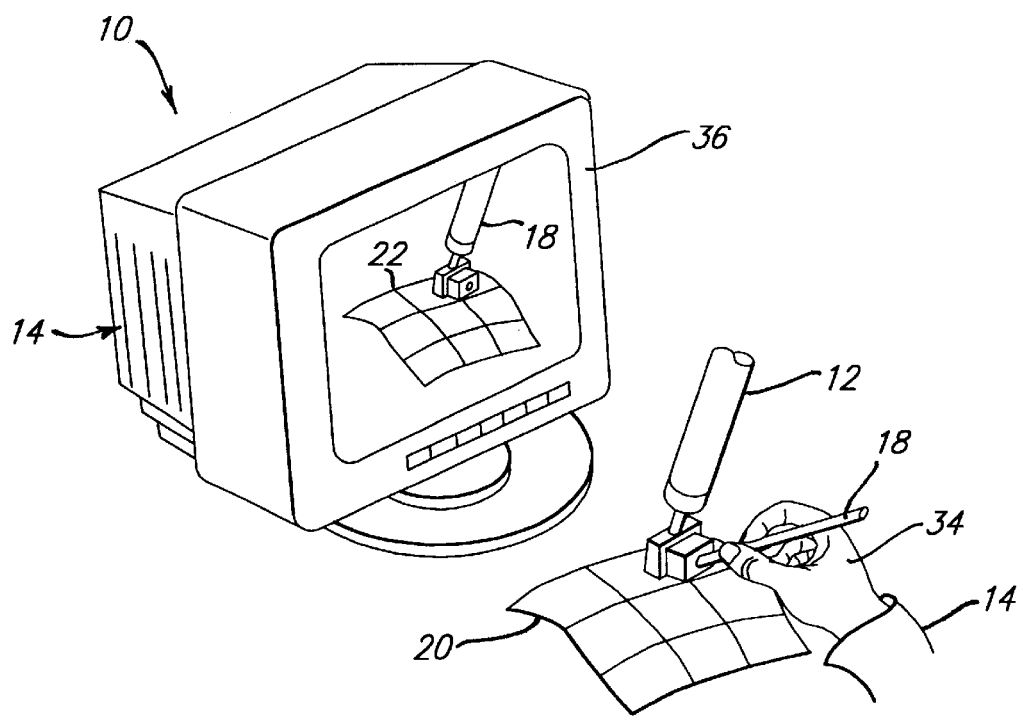
FIG. 3 is a perspective view of a haptic interface browsing and editing a virtual surface, according to the present invention of the system of FIG. 1.

Referring to the drawings and in particular to FIGS. 1 through 3, a system 10 for interactive evaluation of a geometric model, according to the present invention, is illustrated graphically. The system 10 includes a haptic interface 12 operated by a user 14 that controls position, orientation, and force feedback between the user 14, a computer system 16, and a virtual object. The virtual object is a geometric model representing the design form of a physical model. In this example, the computer generated geometric model represents a design form for a vehicle (not shown). The vehicle design is typically generated through the use of conventional computer aided design (CAD), including computer aided manufacturing (CAM) and computer aided engineering (CAE) techniques.

The haptic interface 12 includes a haptic end effector device 18, such as a stylus, pen, or any other similar gripping device. The haptic end effector device 18 is grasped by the user 14 and translates information regarding a surface of the geometric model, such as sensations of rigidity and facial roughness.

In this example, an active force is applied to the haptic end effector device 18 to constrain the user's hand onto a virtual surface 20 representing a surface of the geometric model, shown at 22 in FIG. 3. Preferably, the haptic interface 12 includes at least three degrees of freedom in order to interact with three-dimensional objects. In addition, if the haptic interface 12 has six degrees of freedom, a torque can also be applied to constrain the haptic end effector device 18 and the user's hand orientation to follow a curvature of the surface 20. By forcing the haptic end effector device 18 to stick to the surface 20 representing the geometric model 22, the user 14 receives tactile information for assessing a quality of the geometric design. Similarly, by forcing the haptic end effector device 18 to stick to the surface 20, and the surface 20 to stick to the haptic end effector device 18, the user 14 can edit the surface. Further, if the haptic end effector device 18 is constrained to be normal to the surface 20, it allows for an evaluation and editing of geometric properties including curvature changes, discontinuities, irregularities, smoothness and fairness. In automotive vehicle styling, for example, the haptic end effector device 18, in conjunction with the method of interactive evaluation to be described, enables the user 14 to touch, feel, and edit complex three-dimensional CAD geometry.

The haptic interface 12 also includes a hingeable arm 26. In this example, the hingeable arm 26 includes an upper arm 28 and a lower arm 30. The haptic end effector device 18 is attached to the upper arm 28. The lower arm 30 is attached to a base 32. The haptic interface 12 is operatively connected to an actuating device 33, such as a servo I/O interface, or other similar device capable of transmitting forces to the end effector device 18 through the arms 28,30 in at least three degrees of freedom. Information regarding an interaction with the object is transmitted through the haptic end effector device 18 and the arm 26 to the computer system 16. For example, the haptic end effector device 18 provides a physical connection between a hand 34 of the user 14 and the computer model 22, constraining the user's motion to always be on the surface 20. In addition, the user 14 can tap on a portion of the computer model 22. In this example, the computer model 22 is a three-dimensional computer-aided design of a vehicle or a portion thereof. Advantageously, the haptic interface 12 provides an interface between a real world and a virtual world.

The system 10 further includes a computer system 16, as is known in the art, operatively connected to the haptic interface 12. The computer system 16 includes a processor, a controller, and a memory to process information relevant to the method according to the present invention, of interactive evaluation and manipulation of a geometric model. The computer system 16 includes a display device 36, such as a video terminal, to display the computer aided vehicle design.

The user 14 inputs information into the computer system 16 when prompted to do so. Selection and control of the information within a screen can be achieved by the user 14 via a user interactive device 38 such as a keyboard. The set of parameters or the set of instructions may be specific to the method of interactive evaluation of a geometric model, wherein other data and information non-specific to the method may already be stored in the memory of the computer system 16. One example of an input method is a pop-up dialog box containing available information or instructions. For example, information may be representative of different vehicle design alternatives. The computer system 16 utilizes the set of information or instructions from the user 14 and any other information in carrying out the method, according to the present invention and discussed in detail subsequently, of interactive evaluation and manipulation of a geometric model.

The system 10 also include a virtual reality display system 40. Preferably, the virtual reality display system 40 includes a head mounted display device 42, as is known in the art. The virtual reality display device 42 is worn by the user 14 and allows the user 14 to Asee@a virtual environment. The virtual reality display system 40 is in communication with the computer system 16 and provides the user 14 a view through a virtual human=s eyes or a first person view of the virtual environment. For example, the position of the haptic end effector device 18 is measured, mapped into a reference frame of the mathematical model, and visually rendered on either the display device 36, the head mounted display device 42, or another type of graphical display device 42, as is known in the art. Advantageously, the system 10 can be utilized to evaluate a vehicle design based on various factors, such as assembly verification and ergonomics, early in the design process.

In operation, the controller sends the computer system 16 a signal representing a joint position for the joints between the haptic end effector device 18, upper arm 28, lower arm 30 and base 32, respectively. The computer system 16 sends force signals to the controller, which controls the servo I/O interface 33 to generate the necessary forces applied by the haptic end effector device 18. The user 14 can view the geometric model 24, such as on the display device 36 or in the head mounted display device 14. The user 14 manipulates the haptic end effector device 18 to Atrack@along a surface of the geometric model 24. The method of the present invention constrains the motion of the haptic end effector device 18 to stick to the virtual surface 20 of the geometric model 24 and the surface 20 to stick to the haptic end effector device 18 to enable the user 14 to explore, feel, and manipulate the geometric model 24. Advantageously, this is a time and cost savings as compared to a user exploring and sculpting a physical model.

Advantageously, the computer-implemented method, according to the present invention, of interactive evaluation and manipulation of a geometric model combines all of the foregoing to provide an efficient, flexible, rapid tool for evaluating the design of a vehicle. Furthermore, information obtained during the evaluation of the design is an output of the method and is available for further analysis and study.

Referring to FIGS. 4A through 4E, a method, according to the present invention, is illustrated. Advantageously, the haptic interface 12 is constrained to follow the virtual surface 20 and simultaneously, the virtual surface 20 is controlled to follow the haptic interface 12 in a process referred to as stick-to-surface/stick-to-pen. Preferably, the surface is sculpted in a way such that a selected control point can be grabbed and then pushed and pulled in both directions, while simultaneously applying a force feedback through the haptic interface 12, to convey a local surface property to the user 14. It should be appreciated that the methodology is executable in an iterative manner, for the user 14 interactively evaluating and manipulating the surface 22 of the geometric model 24. It should also be appreciated that a parallel process operating on the computer system 16 may periodically display the geometric model 24 and a simplified representation of the haptic end effector device 18 onto the 2-dimensional display device 36 or the head mounted display mechanism 42.

The methodology begins in bubble 100 and continues to block 105. It should be appreciated that the methodology can be implemented in an iterative manner, as a user 14 browses and sculpts a free-form surface. In block 105, a user 14 selects a geometric model 24 for interactive evaluation and manipulation of a surface and the model 24 is imported into the methodology. Preferably, the geometric model 24 is a computer generated, computer-aided design (CAD) model, digital buck or other mathematical or geometric representation and is maintained in a computer database. The geometric model 24 is represented using a known data format, such as a set of NURBS, a three-dimensional solid CSG, or a polygonal soup. In this example, the geometric model 24 represents a vehicle, and in particular a portion of a body of the vehicle. Further, the user 14 may select a surface 22 representing a section of the geometric model 24 to evaluate, such as by drawing a box (not shown) around the desired section of the geometric model 24 to evaluate using the user interactive device 38 such as a mouse. It should be appreciated that the drawing process includes a click, drag, and release of the mouse as is known in the art. The methodology advances to diamond 110.

In diamond 110, the user 14 determines whether to continue with browsing or editing the model. If the user determined to end browsing or editing the model, the methodology advances to bubble 150 and ends. Returning to diamond 110, if the user determines to continue with browsing or editing, the methodology advances to block 115 and continues.

In block 115, the user 14 browses the surface as a force feedback is applied to constrain the haptic end effector device 18 to the virtual surface 20. An example of a method of browsing the surface is described with respect to FIG. 4E. It should be appreciated, that while browsing the surface, a force feedback is applied to the haptic end effector device 18 to constrain the user's hand motion to remain on the virtual surface 20 representing the surface 27 of the geometric model 24. It should also be appreciated that the virtual surface 20 is static in the browsing mode and an attempt to pull away from the surface of the model results in a progressively increasing resisting force. The methodology advances to diamond 120.

In diamond 120, the methodology determines whether the user 14 is activating a signal to edit the surface 22 of the model 24 using haptic sculpting. Various types of signals are contemplated, including but not limited to, a switch integral with the haptic end effector device 18, a user interface menu or icon displayed on the display device 36, pressure on the virtual surface 20, or orientation of the haptic end effector device 18. Preferably a signal indicating an amount of force applied by the user 14 onto the virtual surface 20 is used to seamlessly transition between the browsing and editing modes, since in both modes the haptic end effector device 18 is located on the virtual surface 20 of the model 24. For example, a force/torque required output on the haptic end effector device 18 can be determined by integrating the force over a scrolling time window $\blacklozenge T$, $f_{cum} = -\int_{t-\Delta t}^{t} F(t)dt$. A filter can be used to filter out extraneous noise. If $f_{cum} > F_{toggle}$, the method automatically switches to the editing mode. Preferably, as a user 14 pulls or pushes the haptic end effector device 18 with a certain strength at the surface, it will signal the methodology that the user 14 wants to edit the surface of the model 24. If the user 14 has not activated a signal to edit the surface, the methodology returns to block 110 and continues to browse the surface of the model 24. If the user 14 has activated a signal to edit the surface, the methodology advances to block 125.

In block 125, the methodology determines a position of the haptic end effector device 18 and identifies a point on the surface 22 of the model 24 to edit. The methodology advances to circle A illustrated in FIG. 4B to determine the position of the haptic end effector device 18 and the point on the surface of the model 24 to edit. Preferably, the position of the haptic end effector device 18 is the origin. The methodology returns from circle A and advances to diamond 130.

In diamond 130, the user 14 selects whether to use a fixed point editing mode or a moving point editing mode to edit the closest point, $P_{modify}$. If a fixed point mode is selected, the methodology advances to block 135.

Figures 4A, 4B:
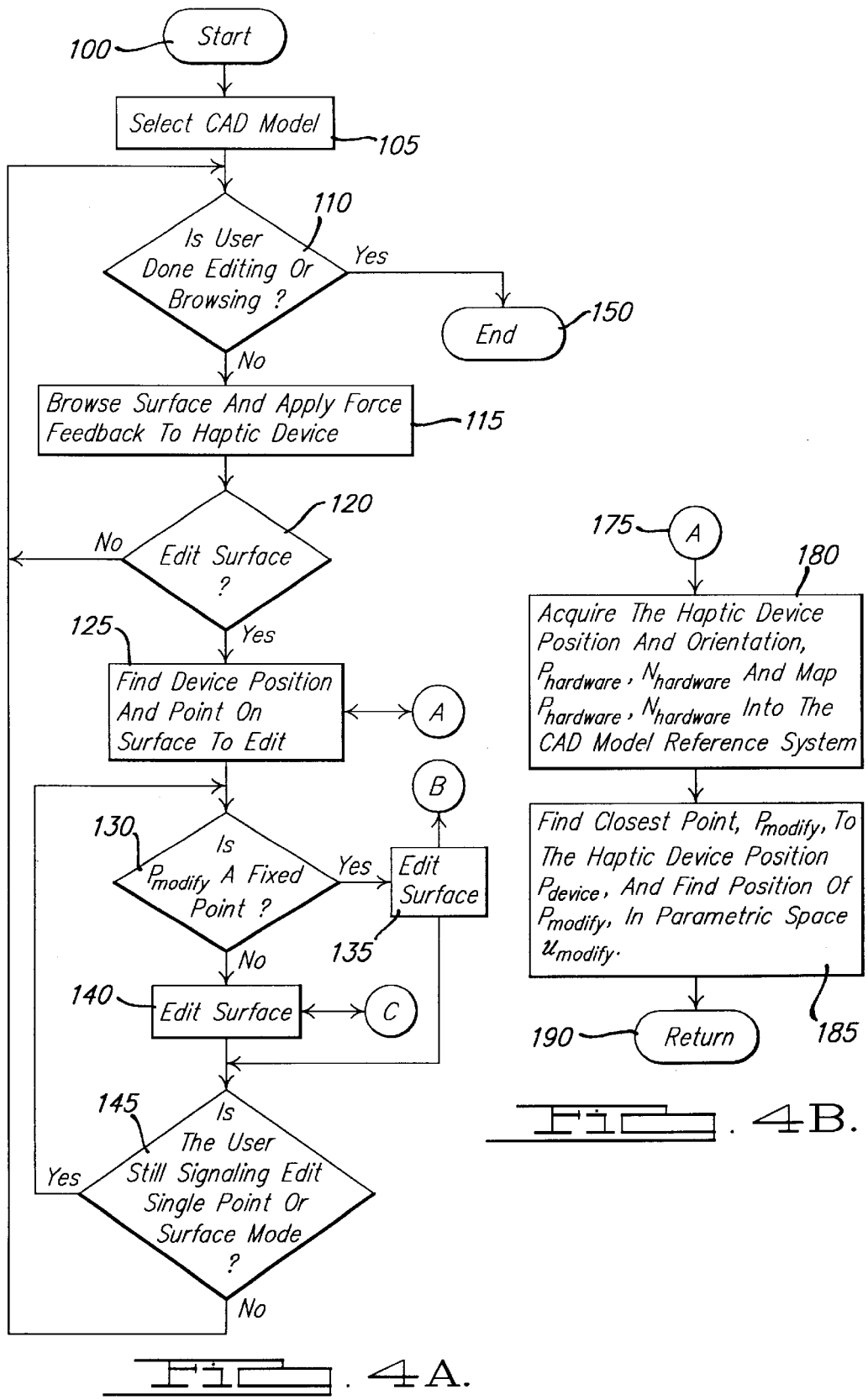
FIGS. 4A through 4E are flowcharts of a method of interactive evaluation and manipulation of a geometric model, according to the present invention and using the system of FIG. 1.
Figures 4C, 4D:
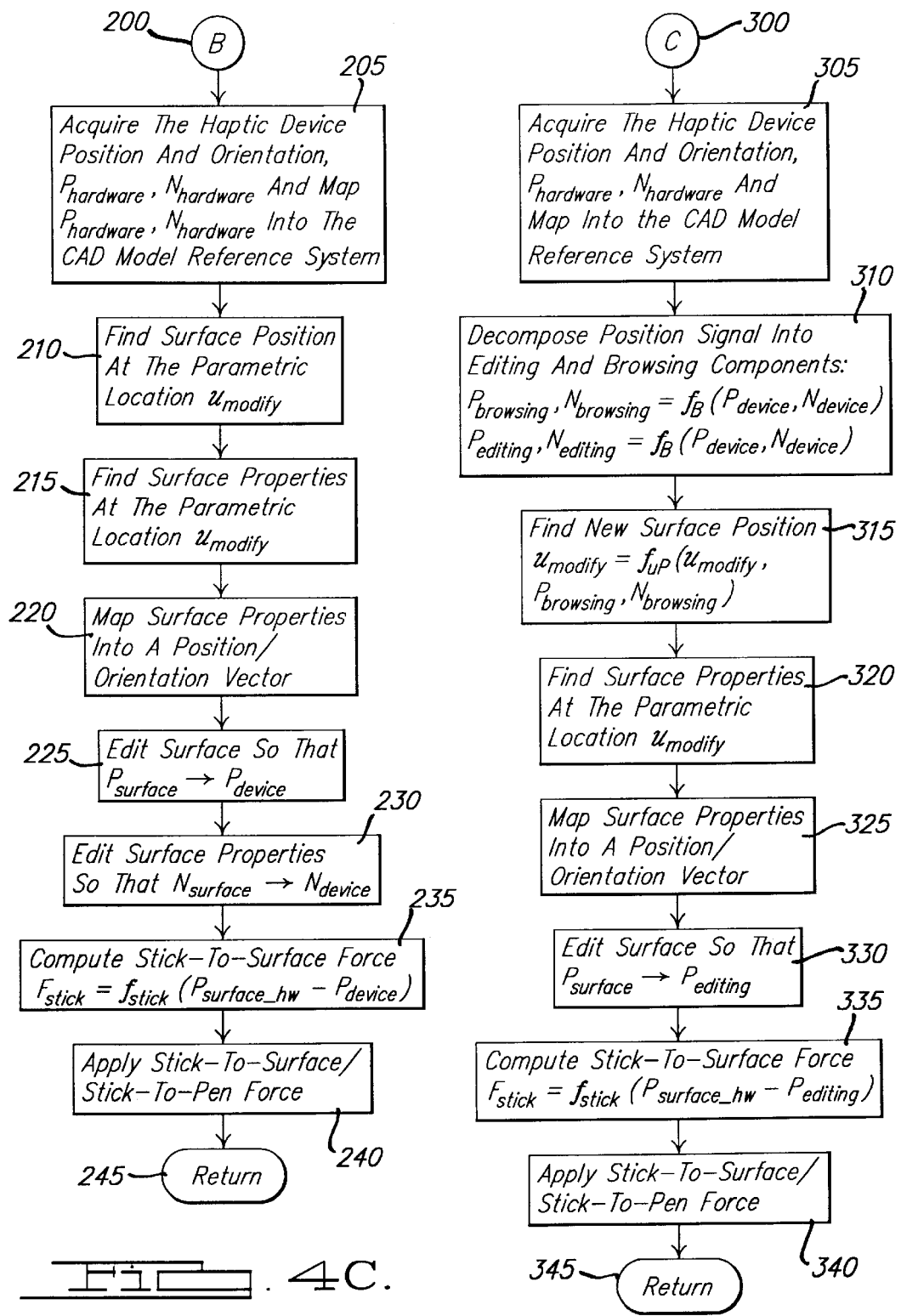

In block 135, the methodology edits the surface 20 using the fixed point editing mode by advancing to Circle B illustrated in FIG. 4C. The methodology edits the surface 20 and returns from circle B and advances to block 145. Returning to diamond 130, if a moving point editing mode is selected to edit the closest point $P_{modify}$, the methodology advances to circle C illustrated in FIG. 4D. The methodology edits the surface and returns from circle C and advances to block 145.

In diamond 145, the methodology determines whether the user 14 is still signaling to edit the virtual surface 20. If the user 14 is still signaling to edit the surface 20, the methodology returns to diamond 130 and the user continues to edit the surface 20. If the user 14 is not signaling to edit the surface 20, the methodology returns to diamond 110 and continues.

Referring to FIG. 4B, a methodology for locating the position of the haptic end effector device 18 and a closest point on the surface 20 to the position of the haptic end effector device 18 is illustrated. The methodology begins in circle A, shown at 175, when called for by block 125 of FIG. 4A. The methodology advances to block 180. In block 180, the methodology acquires the haptic end effector device position $P_{hardware}$ and orientation $N_{hardware}$, and maps $P_{hardware}$ and $N_{hardware}$ into the reference system for the geometric model 24, which is the CAD reference system of this example.

Preferably, a workspace reference frame, origin (0,0,0) and scale of the geometric model 24 is established, so that the reference frames of the haptic end effector device 18 and geometric model 24 are coordinated. The haptic end effector device position $P_{hardware}$ represents the physical position of the haptic end effector device 18, and the orientation $N_{hardware}$ represents the physical orientation of the haptic end effector device 18. Preferably, the haptic end effector device position is acquired using a tracking technique, as is known in the art.

The haptic end effector device position $P_{hardware}$ and orientation $N_{hardware}$ are mapped into the geometric model reference system, which in this example is a CAD model. For example, the haptic end effector device position is mathematically derived by applying a mapping function $f_p$ to the haptic device position $P_{hardware}$ as follows:

$$P_{device} = f_p(P_{hardware})$$

The orientation of the haptic end effector device 18 is similarly mapped into the CAD space using:

$$N_{device} = f_N(N_{hardware}).$$

$P_{device}$ and $N_{device}$ represent the new position and orientation of the haptic end effector device 18 mapped into the reference system for the model 24. An example of a mapping technique is disclosed in U.S. Pat. No. 5,693,013 entitled "Force Feedback Haptic Interface for a Three-dimensional Haptic interface." The methodology advances to block 185.

In block 185, the methodology finds a closest point to edit, referred to as $P_{modify}$, on the surface 20 of the model 24 to the haptic device position $P_{device}$. For example, $P_{modify}$ can be derived using a closed form solution or a numerical solution to approximate its position, as is known in the art. The methodology then maps the position of $P_{modify}$ in parametric space. The position of $P_{modify}$ in parametric space is $U_{modify}$. The methodology advances to bubble 190 and returns to the entry point in FIG. 4A.

Referring to FIG. 4C, a methodology for editing a fixed point in parametric space on the surface 20 is illustrated. It should be appreciated that editing the virtual surface 20 using a fixed point provides for more precise control of the virtual surface 20 than for a non-fixed point. The methodology begins in circle B, shown at 200, when called for by block 135 of FIG. 4a. The methodology advances to block 205.

In block 205, the methodology acquires the haptic device position $P_{hardware}$ and orientation $N_{hardware}$, as described with respect to FIG. 4B. The methodology also maps $P_{hardware}$ and $N_{hardware}$ into the CAD model reference system as previously described with respect to FIG. 4B. The haptic device position $P_{hardware}$ and orientation $N_{hardware}$ are referred to as $P_{device}$ and $N_{device}$ in the CAD reference system of this example. It should be appreciated that the haptic end effector device position is continuously acquired, since it may have moved, and it is desirable to know by how much the haptic end effector device position has moved.

$P_{device}$ and $N_{device}$ represent the new position and orientation of the haptic end effector device 18 mapped into the reference system for the model 24. The methodology advances to block 210.

In block 210, the methodology finds a surface position at the parametric closest point location $u_{modify}$. It should be appreciated that $u_{modify}$ represents a parametric coordinate location of a point on the surface closest to the haptic end effector device position, and $P_{surface}$ represents the coordinate location of $u_{modify}$. It should also be appreciated that $P_{surface}$ may be changing in space, as the haptic end effector device position changes. The methodology advances to block 215.

In block 215, the methodology extracts a surface property of the model 24 at the parametric closest point location $u_{modify}$. An example of a surface property is a surface normal $SN_{surface}$, or a curvature value $Sk_{surface}$. For example, the surface normal is:

$$SN_{surface}(u_{modify})$$

The surface properties can be computed using known techniques. For example, an analytical technique is used if the geometric representation is the true description of the geometric model 24, such as with a NURBS surface. Alternatively, the surface properties can be computed by interpolation or shading if the geometric representation is, by way of example, a polygonal tessellation or a volumetric approximation. The methodology advances to block 220.

In block 220, the methodology maps the surface properties of $u_{modify}$ into a position or orientation vector, in order to mathematically convey these properties as the virtual surface 20 is edited. Advantageously, the reference frame of the position or orientation vector is generic, in order to map from one physical domain into another. For example:

$$P_{surface} = f_{SN}(SP_{surface})$$

$$N_{surface} = f_{SN}(SN_{surface})$$

The methodology advances to block 225.

In block 225, the methodology edits the virtual surface 20 in the neighborhood of $u_{modify}$, so that $P_{surface}$ approaches $P_{device}$. Therefore, the coordinate locations that define the surface 20 are modified and a new best set of parameters is found that represent the new location. In other words, the haptic end effector device 18 is dragged to change $u_{modify}$. For example, if $P_{surface} \ne P_{device}$ and/or $N_{surface} \ne N_{device}$, then the geometry of the model 24 is modified to achieve an equality condition. If the geometry is described using NURBS, an implicit parametric representation, the surface shape at $u_{modify}$ is influenced by the location of a certain number of control points, $CP_{ij}$, in the neighborhood of the point on the surface, and by an associate weighted value, $W_{ij}$. The exact solution to $$[\Delta CP_{ij}, \Delta W_{ij}, i= \ldots, j= \ldots ]$$

that satisfies $$[P_{surface}(CP_{ij}, W_{ij}) = P_{device} \text{ and } N_{surface}(CP_{ij}, W_{ij}) = N_{device}]$$

cannot be found in real time. However, a closed loop controller can use the position and orientation of the haptic end effector device 18 as a reference point and iteratively modify the control points of the surface 20 along the local deepest descent direction, according to a tunable proportional gain K to find the solution. The methodology advances to block 230.

In block 230, the methodology edits a surface property, including a surface normal, $N_{surface} \rightarrow N_{device}$, texture or color, in a neighborhood of the closest point $U_{modify}$. It should be appreciated that the surface property is modified relative to the haptic end effector device orientation to replicate the surface properly. Preferably the surface property is displayed on the display device 36 as it is edited. The methodology advances to block 235.

In block 235, the methodology computes a force feedback representing a stick-to-surface/stick-to pen force to control the force output of the haptic end effector device 18 to stick to the virtual surface 20 and the virtual surface 20 to stick to the haptic end effector device 18. Advantageously, the properties of the virtual surface 20 are tactilely conveyed to the user 14 by constraining the haptic end effector device 18 to the surface 20 and the surface 20 to the haptic end effector device 18. In this manner, the user 14 can feel the surface properties. The orientation of the haptic end effector device 18 is used to provide the user 14 with feedback as to what properties are changing on the virtual surface 20 of the model 24. The stick-to-surface/stick-to-pen force conveys the attraction of the haptic end effector device 18 to the surface 20 of the model 24 and the attraction of the surface 20 to the haptic end effector device 18. Also, the stick-to-surface/stick-to-pen force maintains the orientation of the haptic end effector device 18 parallel to the normal of the surface 20, and the haptic end effector device 18 in contact with the surface 20. For example, the mathematical relationship $(P_{surface\_hw} - P_{hardware})$ is used to control the force output of the haptic end effector device 18 to constrain the tip of the pen to the surface 20 using:

$$F_{stick} = f_{stick}(P_{surface\_hw} - P_{hardware}).$$

The methodology also computes a surface property-feedback force. The surface property feedback force represents a torque applied to a tip of the haptic end effector device 18 to constrain the orientation of the haptic end effector device 18 to convey the selected surface property to the user 14. For example, the mathematical relationship $N_{surface\_hw} - N_{hardware}$ is used to control the force output to convey surface properties to the user using:

$$F_{sp} = f_{sp}(N_{surface\_hw} - N_{hardware}).$$

The methodology advances to block 240.

In block 240, the stick-to-surface/stick-to-pen force, $F_{stick}$ and property feedback force, $F_{sp}$, are added together and applied to the haptic end effector device 18. Advantageously, the user's hand 34 and the virtual surface 20 are locked together as he/she browses the virtual surface 20 using the haptic end effector device 18. The user 14 receives tactile and visual stimulation directly from the model 24. Geometric properties such as curvature changes, discontinuities, irregularities, smoothness, and fairness are conveyed to the user 14 that could previously only be conveyed via a physical prototype.

Figure 5:
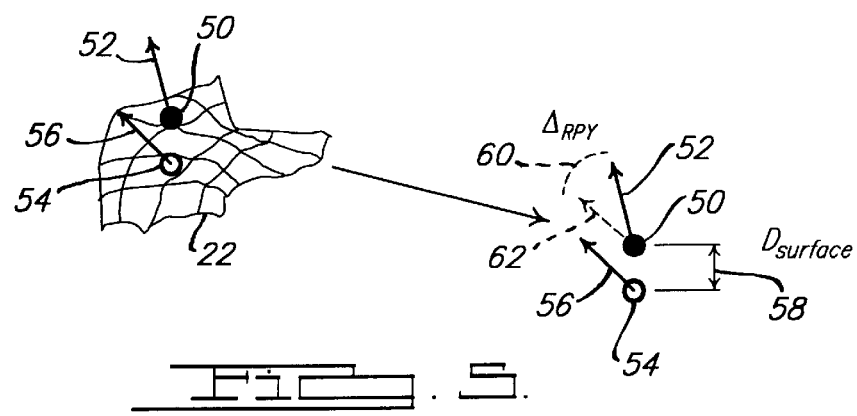
FIG. 5 is a diagrammatic view of a haptic device position and orientation for a geometric model, according to the present invention, using the system of FIG. 1.

Preferably, $P_{surface}$ and $N_{surface}$ are used as reference values to control the location and/or force output of the haptic end effector device 18. For example, the distance $D_{surface}$ between $P_{surface}$ and $P_{hardware}$ shown at 58 in FIG. 5 and the angular displacement $\Delta_{rpy}$ shown at 60 in FIG. 5 are determined. The angular displacement $\Delta_{rpy}$ is the difference between $N_{surface}$ and $N_{hardware}$, expressed in Roll-Pitch-Yaw (RPY) angles, as is known in the art. The orientation of the haptic end effector device 18 is also expressed in RPY.

Next, it is determined whether $D_{surface}$ and $\Delta_{rpy}$ are less then threshold vectors $D_{thrsld}$ and $\Delta_{thrsld}$, respectively. A torque vector, as shown at 62, is applied at the haptic end effector device actuators 33 that will produce an equivalent force or torque at the haptic end effector device 18 that is proportional to $D_{surface}$ and $\Delta_{rpy}$ and orientated along their respective vectors. It should be appreciated that if the haptic end effector device 18 is a predetermined distance from a target position and orientation of the surface 20, an incrementally decreasing force is applied to the haptic end effector device 18, to maintain the stability of the system 10 and avoid the application of an excessively large force to the user 14.

The methodology advances to bubble 245 and returns to block 135 in FIG. 4A.

Referring to FIG. 4D, a methodology for editing a non-fixed point in parametric space on the surface 20 is illustrated. The methodology begins in circle C, shown at 300, when called for by block 140 of FIG. 4A. The methodology advances to block 305.

In block 305, the methodology acquires the haptic device position $P_{hardware}$ and orientation $N_{hardware}$, and maps $P_{hardware}$ and $N_{hardware}$ into the CAD model reference system, as previously described with respect to a fixed point on the surface 20. The haptic device position $P_{hardware}$ and orientation $N_{hardware}$ are similarly referred to as $P_{device}$ and $N_{device}$ in the CAD reference system of this example. It should be appreciated that the haptic end effector device position is continuously acquired, since the haptic end effector device position is moving.

$P_{device}$ and $N_{device}$ represent the new position and orientation of the haptic end effector device 18 mapped into the reference system for the model 24. The methodology advances to block 310.

In block 310, the methodology obtains a browsing and editing component of the haptic device position signal. Preferably, the browsing and editing components of the position signal are obtained by decomposing a haptic device displacement vector $\Delta P$ into three subspaces, the browsing $\Delta B$, editing $\Delta M$ and null spaces $\Delta O$. It should be appreciated that the null space may be empty, whereby motion generates neither browsing or editing. It should also be appreciated that this subdivision of spaces can be fixed or a function of a surface property. The editing and browsing components of the position signal can be decomposed using:

$$P_{browsing}, N_{browsing} = f_B(P_{device}, N_{device})$$

$$P_{editing}, N_{editing} = f_B(P_{device}, N_{device})$$

More specifically, decomposition can be achieved using three projection matrices, $M_B, M_M, M_O$. Preferably, these matrices are symmetric and have minors less than 1 to insure that the projected vectors are never longer than the original displacement vector. To satisfy:

$$\Delta P = \Delta B + \Delta M + \Delta O$$

they must add up to the identity matrix and all cross products must produce matrices with all zero elements. Further, each subspace can be either a free line defined by the unit vector $n=(n_x, n_y, n_z)$ a plane containing the origin whose normal is the unit vector $n=(n_x, n_y, n_z)$, or the entire space. Examples of matrices of norm 1, 2 and 3 includes:

$$M_{line} = \begin{bmatrix} N_x^2 & N_x N_y & N_x N_z \\ N_y N_x & N_y^2 & N_y N_y \\ N_y N_x & N_y N_y & N_y \end{bmatrix} \quad M_{plane} = \begin{bmatrix} 1-N_x^2 & -N_x N_y & -N_x N_y \\ -N_y N_x & 1-N_y^2 & 1-N_y N_z \\ -N_y N_x & -N_y N_y & 1-N_z^2 \end{bmatrix}$$

$$M_{space} = I_{3,3}$$

The methodology advances to block 315.

In block 315, the methodology finds a new surface position at the parametric closest point location $u_{modify}$. It should be appreciated that $u_{modify}$ represents a location of a node within the network for finding the closest point, as described with respect to FIG. 4C. Preferably, the previous value of $U_{modify}$, $P_{browsing}$ and $N_{browsing}$ are used to find the new surface parametric location: $U_{modify} = f_{up}(U_{modify}; P_{browsing}; N_{browsing})$. For example, a browsing vector $P_{browsing}, N_{browsing}$ can be used to determine the new surface position of $U_{modify}$ on the surface $u_{modify+1}$. Similarly, a tracking point $T_t$ follows the device motion in the browsing subspace. The displacement in parameter space is found using $$U_{modify} = f_{up}(U_{modify}; P_{browsing}; N_{browsing})$$

rewritten as $$U_{modify} = f_{up}(\Delta B), \; T_{i+1} = S_t(U_{i+1}, V_{i+1})$$

It should be appreciated that the choice of $f_{up}$ is not unique and can be found by projecting the surface derivatives in the parameters $U_{modify}$, expressed as u,v as:

$$S_u = \frac{dS(u,v)}{du} \quad S_v = \frac{ds(u,v)}{dv}$$

On the browsing subspace:

$$S_{up} = M_b S_u, \; S_{vb} = M_b S_v$$

In a neighborhood of the current point, the first order approximation holds:

$$S(u+\Delta u, u+\Delta v) - S(u,v) = [S_u S_u] \cdot \begin{bmatrix} \Delta u \\ \Delta v \end{bmatrix}$$

And this must also be true in the projected subspace, $$\Delta B = [S_{ub} S_{ub}] \cdot \begin{bmatrix} \Delta u \\ \Delta v \end{bmatrix}$$

$F_B$ is obtained by solving AB in the unknown $\Delta u \Delta v$ as:

$$\begin{bmatrix} \Delta u \\ \Delta v \end{bmatrix} = \begin{bmatrix} S_{ub}^T S_{ub} & S_{ub}^T S_{vb} \\ S_{ub}^T S_{vb} & S_{ub}^T S_{vb} \end{bmatrix}^{-1} \cdot \begin{bmatrix} S_{ub}^T \\ S_{ub}^T \end{bmatrix} \cdot \Delta B$$

It is also possible to constrain motion in parametric space to track or manipulate the surface along curves in parametric space. For example, using:

$$\begin{bmatrix} \Delta u_c \\ \Delta v_c \end{bmatrix} = \begin{bmatrix} l_u^2 & l_u l_v \\ l_u l_v & l_u^2 \end{bmatrix} \cdot \begin{bmatrix} \Delta u \\ \Delta v \end{bmatrix}$$

Where $1+\{l_u, l_v\}$ is the unit tangent vector of the curve in parametric space. The new tracking point can be found by solving:

$$T_{t+1} = S_t(U_{t+1}, V_{t+1}) = S_t(U_t + \Delta U_c, V_t + \Delta V_c)$$

The methodology advances to block 320.

In block 320, the methodology extracts surface properties at the parametric location $u_{modify}$, in order that the pen is oriented normal to the surface when it sticks to the surface. An example of a surface property is a surface normal $SN_{surface}$, or a curvature value $Sk_{surface}$. For example, the surface normal is:

$$SN_{surface}(u_{modify})$$

The surface properties can be computed using known techniques. For example, an analytical technique is used if the geometric representation is the true description of the geometric model 24, such as with a NURBS surface. Alternatively, the surface properties can be computed by interpolation or shading if the geometric representation is, by way of example, a polygonal tessellation or a volumetric approximation. The methodology advances to block 325.

In block 325, the methodology maps the surface properties of $u_{modify}$ into a position or orientation vector. Advantageously, the reference frame of the position or orientation vector is generic, in order to map from one physical domain into another. For example:

$$P_{surface} = f_{SN}(SP_{surface})$$

$$N_{surface} = f_{SN}(SN_{surface})$$

The methodology advances to block 330.

In block 330, the methodology edits the virtual surface 20 in the neighborhood of $u_{modify}$, so that $P_{surface}$ approached $P_{device}$, as described with respect to FIG. 4C. For example, the current tracking point as previously described may be used to determine the active portion of surface 20 that will be manipulated to follow the user displacement $\Delta M$:

$$S_{t+1} = S_{t+1}(U_{t+1}, V_{t+1}) = S_t(U_{t+1}, V_{t+1}) + f_m(\Delta M)$$

It should be appreciated that a function $f_M$ is selected to guarantee the desired convergence rate of the surface position at the tracking point to the haptic end effector device position. Also, the surface parameter is manipulated to satisfy $S_{t+1}(U_{t+1}V_{t+1})$. The methodology advances to block 335.

In block 335, the methodology edits a surface property, including a surface normal, texture or color, in a neighborhood of the closest point $u_{modify}$. It should be appreciated that the surface property is modified relative to the haptic end effector device position and orientation, so that $N_{surface}$ converges on $N_{device}$, as described with respect to FIG. 4C. The methodology advances to block 340.

In block 340, the methodology computes a force feedback representing a stick-to-surface force/stick-to-pen force and a property-feedback force to control the force output of the haptic end effector device 18 to stick to the virtual surface 20. Advantageously, the properties of the virtual surface 20 are tactilely conveyed to the user 14 by locking together the haptic end effector device 18 and the virtual surface 20. In this manner, the user 14 can feel the surface properties. The orientation of the haptic end effector device 18 is used to provide the user 14 with feedback as to what properties are changing on the surface 22 of the model 24. The stick-to-surface/stick-to-pen force conveys the attraction of the haptic end effector device 18 to the surface 20 of the model 24. Also, the stick-to-surface and stick to pen force maintains the orientation of the haptic end effector device 18 parallel to the normal of the surface 20, and the haptic end effector device 18 in contact with the surface 20. For example, the mathematical relationship $P_{surface\_hw} - P_{hardware}$ is used to control the force output of the haptic end effector device 18 to constrain the tip of the pen and the surface together using:

$$F_{stick} = f_{stick}(P_{surface\_hw} - P_{hardware}).$$

The methodology computes a property-feedback force. The property feedback force represents a torque applied to a tip of the haptic end effector device 18 to constrain the orientation of the haptic end effector device 18 to convey the selected surface property to the user 14. For example, the mathematical relationship $N_{surface\_hw} - N_{hardware}$ is used to control the force output to convey surface properties to the user using:

$$F_{sp} = f_{sp}(N_{surface\_hw} - N_{hardware}).$$

The methodology advances to block 340. In block 340, the stick-to-surface force/stick-to-pen force, referred to as $F_{stick}$, and property feedback force $F_{sp}$ are added together and applied to the haptic end effector device 18. Advantageously, the user's hand 34 is constrained to the virtual surface 20 as he/she browses the surface 20 using the haptic end effector device 18. The user 14 receives tactile and visual stimulation directly from the model 24. Geometric properties such as curvature changes, discontinuities, irregularities, smoothness and fairness are conveyed to the user 14 that could previously only be conveyed via a physical prototype.

Preferably, $P_{surface}$ and $N_{surface}$ are used as reference values to control the location and/or force output of the haptic end effector device 18 as described with respect to FIG. 4C. The methodology advances to block 345 and returns to block 140 in FIG. 4A.

Figure 4E:
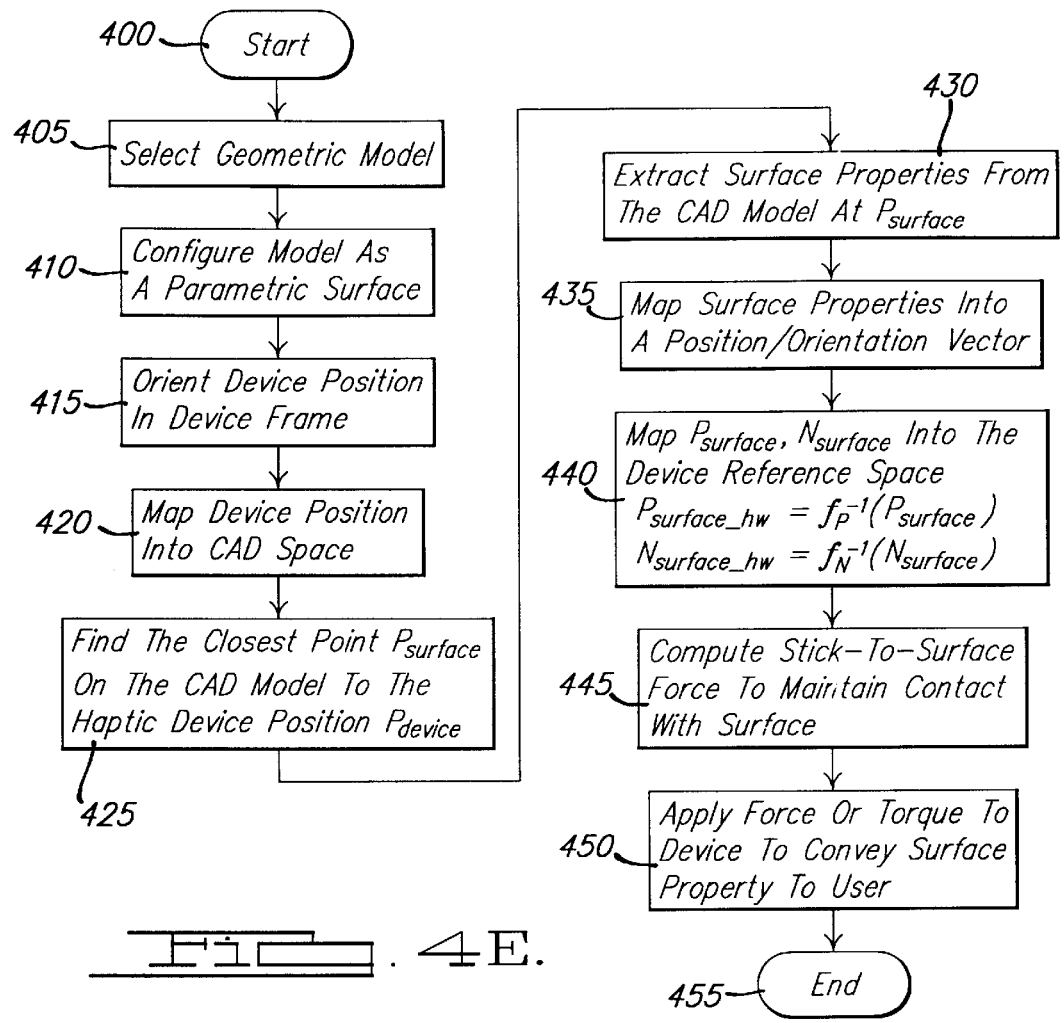

Referring to FIG. 4E, a method, according to the present invention, of browsing a geometric model is illustrated. Advantageously, the methodology provides the user 14 with tactile and visual information directly from the model 24. The user 14 holds the haptic end effector device 18 and the motion of the haptic end effector device 18 is constrained to the surface 22 of the geometric model 24 and oriented normal to the surface 22. The user 14 can apply the methodology for assessing the smoothness, fairness, or other geometric property of the surface 22. The method begins in block 400 and continues to block 405.

In block 405, the user 14 selects a geometric model 24 for assessing its geometric properties and the model 24 is imported into the methodology if the model 24 is not already selected and imported. The methodology advances to block 410.

In block 410, the methodology configures the geometric model 24 as a parametric surface so that each point representing the model 24 is uniquely identified by a set of coordinates within a known coordinate system. An example of a parametric surface is a NURBS surface, other surface representations like a tessellated mesh can be parametrized such as that described in U.S. Pat. No. 5,903,458 to Stewart et al., entitled "System and Method for Forming Geometric Features Using Global Reparametrization". In addition, a computer program such as SDRC I-DEAS is commercially available for configuring a CAD model as a parametric surface. The methodology advances to block 115.

In block 415, the methodology determines a haptic end effector device position within a haptic end effector device coordinate system reference frame for use in determining the haptic end effector device position and orientation. Preferably, a workspace reference frame, origin (0,0,0) and scale of the geometric model 24 is established, so that the reference frames of the haptic end effector device 18 and geometric model 24 are coordinated. The haptic end effector device position $P_{hardware}$ represents the physical position of the haptic end effector device 18 and the orientation of the haptic end effector device 18 is represented by a normal to the surface of the geometric model 24, referred to as $N_{hardware}$. Preferably, the haptic end effector device position is established using a tracking technique as is known in the art. The methodology advances to block 420.

In block 420, the methodology maps the haptic end effector device position $P_{hardware}$ and orientation $N_{hardware}$ into the geometric model reference system, which in the example is a CAD model. For example, the haptic end effector device position is mathematically derived applying a mapping function $f_p$ to the haptic device position $P_{hardware}$ as follows:

$$P_{device} = f_p(P_{hardware}).$$

The orientation of the haptic end effector device 18 is similarly mapped into the CAD space using:

$$N_{device} = f_N(N_{hardware}).$$

$P_{device}$ and $N_{device}$ represent the new position and orientation of the haptic end effecotr device 18 mapped into the reference system for the model 24. As illustrated in FIG. 5, the haptic end effector device position $P_{device}$ shown at 50 and orientation $N_{device}$ shown at 52 are mapped into the surface of the model 24. The methodology advances to block 425.

In block 425, the methodology finds a closest point $P_{surface}$ and orientation $N_{surface}$ on the CAD model, to the haptic end effector device position, $P_{device}$. As illustrated in FIG. 5, $P_{surface}$ and $N_{surface}$ are shown at 54 and 56, respectively. An example of a mapping technique is disclosed in U.S. Pat. No. 5,694,013 entitled "Force Feedback Haptic Interface for a Three-Dimensional CAD Surface", the disclosure of which is hereby incorporated by reference. The methodology advances to block 430.

In block 430, the methodology extracts surface properties of the model 24 at the closest point position $P_{surface}$ and orientation $N_{surface}$. An example of a surface property is surface normal $SN_{surface}$ or a curvature value $Sk_{surface}$. The surface properties can be computed using known techniques. For example, an analytical technique is used if the geometric representation is the true description of the geometric model 24, such as with a NURBS surface. Alternatively, the surface properties can be computed by interpolation or shading if the geometric representation is, by way of example, a polygonal tessellation or a volumetric approximation. The methodology advances to block 435.

In block 435, the methodology maps the surface properties of the closest point position $P_{surface}$ and orientation $N_{surface}$ into a position or orientation vector. Advantageously, the reference frame of the position or orientation vector is generic, in order to map from one physical domain into another. For example:

$$P_{surface} = f_{sp}(SK_{surface})$$

$$N_{surface} = f_{SN}(SN_{surface})$$

The methodology advances to block 440.

In block 440, the methodology maps the point $P_{surface}$ and orientation $N_{surface}$ surface properties into the haptic end effector device reference system space from the position or orientation vector. For example:

$$P_{surface\_hw} = f_p^{-1}(P_{surface})$$

$$N_{surface\_hw} = f_n^{-1}(N_{surface})$$

The methodology advances to block 445.

In block 445, the methodology computes a force feedback representing a stick-to-surface force and a property-feedback force. Advantageously, the properties of the surface are tactilely conveyed to the user 14 by constraining the haptic end effector device 18 to the surface 20. In this manner, the user 14 can feel the surface properties. The orientation of the haptic end effector device 18 is used to provide the user 14 with feedback as to what properties are changing on the surface 20 of the model 24. The stick-to-surface force conveys the attraction of the haptic end effector device 18 to the surface 20 of the model 24. Also, the stick-to-surface force maintains the orientation of the haptic end effector device 18 parallel to the normal of the surface 20, and the haptic end effector device 18 in contact with the surface 20. For example, the mathematical relationship $P_{surface\_hw} - P_{hardware}$ is used to control the force output of the haptic end effector device 18 to constrain the tip of the pen to the surface using:

$$F_{stick} = f_{stick}(P_{surface\_hw} - P_{hardware}).$$

The property-feedback force represents a torque applied to a tip of the haptic end effector device 18 to constrain the orientation of the haptic end effector device 18 to match the selected surface property to the user 14. For example, the mathematical relationship $N_{surface\_hw} - N_{hardware}$ is used to control the force output to convey surface properties to the user using:

$$F_{sp} = f_{sp}(N_{surface\_hw} - N_{hardware}).$$

The methodology advances to block 450. In block 450, the stick-to-surface force, $F_{stick}$ and property feedback force, $F_{sp}$, are added together and applied to the haptic end effector device 18. Advantageously, the user's hand 34 is constrained to the virtual surface 20 as he/she browses the surface 20 using the haptic end effector device 18. The user 14 receives tactile and visual stimulation directly from the model 24. Geometric properties such as curvature changes, discontinuities, irregularities, smoothness, and fairness are conveyed to the user 14, that could previously only be conveyed via a physical prototype.

Preferably, $P_{surface}$ and $N_{surface}$ are used as reference values to control the location and/or force output of the haptic end effector device 18. For example, the distance $D_{surface}$ between $P_{surface}$ and $P_{hardware}$ shown at 58 in FIG. 5, and the angular displacement $\Delta_{rpy}$ shown at 60 in FIG. 5 are determined. The angular displacement $\Delta_{rpy}$ is the difference between $N_{surface}$ and $N_{hardware}$, expressed in Roll-Pitch-Yaw (RPY) angles, as is known in the art. The orientation of the haptic end effector device 18 is also expressed in RPY.

Next, it is determined whether $D_{surface}$ and $\Delta_{rpy}$ are less then threshold vectors $D_{thrsld}$ and $\Delta_{thrsld}$, respectively. A torque vector as shown at 62 is applied at the haptic end effector device actuators 33 that will produce an equivalent force or torque at the haptic end effector device 18, that is proportional to $D_{surface}$ and $\Delta_{rpy}$, and orientated along their respective vectors. It should be appreciated that if the haptic end effector device 18 is a predetermined distance from a target position and orientation of the surface, an incrementally decreasing force is applied to the haptic end effector device 18, to maintain the stability of the system 10 and avoid the application of an excessively large force to the user 14. The methodology advances to block 455 and ends.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A system of interactive evaluation and manipulation of a geometric model comprising:
    a computer system, wherein said computer system includes a memory, a processor, a user input device and a display device;
    a computer generated geometric model stored in said memory of said computer system; and
    a haptic interface operatively in communication with said computer system, wherein said haptic interface includes a haptic end effector device for transmitting information between a user and said geometric model, wherein the user browses or edits the surface of said geometric model using said haptic end effector device, wherein in browsing said surface of said geometric model a stick-to-surface force and property-feedback force are applied to control a location and force output of said haptic end effector device, wherein in editing the surface of said geometric model a haptic device position and orientation on a surface of said geometric model is determined and mapped into a geometric model coordinate reference system, a closest point on the surface of said geometric model to the haptic device position is identified, a surface position of the closest point position is determined, and the surface in the neighborhood of the closest point is edited by converging the closest point on the edited point, a surface property in the neighborhood of the closest point position is edited, and a stick-to-surface/stick-to-pen force and a property-feedback force are determined and applied to said haptic end effector device to constrain a hand of a user to a surface of said geometric model.

2. A system as set forth in claim 1 including a virtual reality display mechanism operatively in communication with said computer system and said haptic interface so the user can see said geometric model in a virtual environment.

3. A system as set forth in claim 1 wherein said haptic interface tactilely conveys a surface property of said geometric model to the user through said haptic end effector device and said haptic end effector device is constrained to the surface of said geometric model and the surface is constrained to said haptic device.

4. A method of interactive evaluation and manipulation of a geometric model, said method comprising the steps of:
    browsing a surface of the geometric model using a haptic end effector device operatively connected to a haptic interface, wherein a stick-to-surface force and property-feedback force are applied to control a location and force output of the haptic end effector device while a user is browsing the surface of the geometric model;
    determining if the user is signaling to edit the surface of the geometric model;
    continuing to browse the surface of the geometric model is the user is not signaling to edit the surface of the model;
    editing the surface of the geometric model if the user is signaling to edit the surface of the geometric model;
    determining a haptic end effector device position on the surface of the geometric model while editing;
    mapping the haptic end effector device position into a coordinate reference frame for the geometric model while editing;
    identifying a closest point to edit on the surface of the geometric model to the haptic end effector device position while editing;
    determining if the user is editing a fixed point or a non-fixed point in a parametric space on the surface;
    editing a fixed point by determining a surface position and property of the closest point, and modifying the geometry of the surface until the closest point converges on the haptic end effector device position;
    editing a non-fixed point by decomposing the haptic end effector device position into editing and browsing components, finding a new surface position on the geometric model using a previous surface position and haptic end effector device position, and modifying the geometry of the surface until the closest point converges on the haptic end effector device position;
    editing a surface property in the neighborhood of the closest point;
    determining a stick-to-surface/stick-to-pen force and a property feedback force using the surface property in the neighborhood of the closest point; and
    applying the stick-to-surface/stick-to-pen force and property feedback force at the closest point to control a location and force output of the haptic end effector device.

5. A method as set forth in claim 4 including the step of selecting a geometric model from a database in the memory of the computer system prior to said step of acquiring the haptic device position, wherein the geometric model is a computer-aided design model.

6. A method as set forth in claim 4 wherein said step of browsing a surface of the geometric model includes the steps of:
    acquiring a haptic end effector device position with respect to a surface of the geometric model, wherein the haptic end effector device is operatively connected to a haptic interface and the geometric model is stored in a memory of a computer system;
    mapping the haptic end effector device position into a geometric model coordinate reference system;
    determining a closest point position on the surface of the geometric model to the haptic device position;
    extracting a surface property at the closest point position;
    determining a stick-to-surface force and a property feedback force using the surface property at the closet point position; and
    applying the stick-to-surface force and property feedback force at the closest point to control a location and force output of the haptic end effector device.

7. A method as set forth in claim 4 wherein said step of signaling to edit includes the user signaling to edit by manipulating the haptic end effector device to exert a predetermined strength on the surface.

8. A method as set forth in claim 4 wherein said step of editing a fixed point includes the steps of:
    acquiring a haptic device position with respect to a surface of the geometric model, wherein the haptic end effector device is operatively connected to a haptic interface and the geometric model is stored in a memory of a computer system;

mapping the haptic end effector device position into a geometric model coordinate reference frame;

determining a closest point position on the surface of the geometric model to the haptic end effector device position;

determining a surface property at the closest point position; and mapping the surface properties into a vector representing position.

9. A method as set forth in claim 4 wherein said step of editing a non-fixed point includes the steps of:

acquiring a haptic end effector device position with respect to a surface of the geometric model;

mapping the haptic device position into a geometric model coordinate reference frame;

finding a new surface position using a previous closest point position and haptic end effector device position;

determining surface properties at the closest point position; and mapping the surface properties into a vector representing position.

10. A method as set forth in claim 4 wherein said step of applying a stick-to-surface/stick-to-pen force and a property feedback force includes the step of tactilely conveying a surface property of the geometric model to a user through the haptic end effector device and constraining the haptic end effector device to the surface of the geometric model, and the surface of the geometric model to the haptic end effector device.

11. A method as set forth in claim 4 wherein the user views the surface of the geometric model using a virtual reality display mechanism in communication with the computer system and the haptic interface.

12. A method of interactive evaluation and manipulation of a geometric model, said method comprising the steps of:

browsing a surface of the geometric model using a haptic end effector device operatively connected to a haptic interface, wherein a stick-to-surface force and property-feedback force are applied to control a location and force output of the haptic end effector device while a user is browsing the surface of the geometric model;

determining if the user is signaling to edit the surface of the geometric model;

continuing to browse the surface of the geometric model is the user is not signaling to edit the surface of the model;

editing the surface of the geometric model if the user is signaling to edit the surface of the geometric model;

determining a haptic end effector device position and orientation on the surface of the geometric model while editing;

mapping the haptic end effector device position and orientation into a coordinate reference frame for the geometric model while editing;

identifying a closest point to edit position and orientation on the surface of the geometric model to the haptic end effector device position and orientation while editing;

determining if the user is editing a fixed point or a non-fixed point in parametric space on the surface;

editing a fixed point by determining a surface position and property of the closest point position and orientation and modifying the geometry of the surface until the closest point position and orientation converges on the haptic end effector device position;

editing a non-fixed point by decomposing the haptic end effector device position and orientation into editing and browsing components, finding a new surface position and orientation on the geometric model using a previous surface position and haptic end effector device position and orientation, and modifying the geometry of the surface until the closest point position converges on the haptic end effector device position;

editing a surface property in the neighborhood of the closest point;

determining a stick-to-surface/stick-to-pen force and a property feedback force using the surface property in the neighborhood of the closest point; and applying the stick-to-surface/stick-to-pen force and property feedback force at the closest point to control a location and force output of the haptic end effector device.

13. A method as set forth in claim 12 including the step of selecting a geometric model from a database in the memory of the computer system prior to said step of acquiring the haptic device position and orientation, wherein the geometric model is a computer-aided design model.

14. A method as set forth in claim 12 wherein said step of browsing a surface of the geometric model includes the steps of:

acquiring a haptic end effector device position and orientation with respect to a surface of the geometric model, wherein the haptic end effector device is operatively connected to a haptic interface and the geometric model is stored in a memory of a computer system;

mapping the haptic end effector device position and orientation into a geometric model coordinate reference system;

determining a closest point position and orientation on the surface of the geometric model to the haptic device position;

extracting a surface property at the closest point position and orientation;

determining a stick-to-surface force and a property feedback force using the surface property at the closet point position and orientation; and applying the stick-to-surface force and property feedback force at the closest point to control a location and force output of the haptic end effector device.

15. A method as set forth in claim 12 wherein said step of signaling to edit includes the user signaling to edit by manipulating the haptic end effector device to exert a predetermined strength on the surface.

16. A method as set forth in claim 12 wherein said step of editing a fixed point includes the steps of:

acquiring a haptic device position and orientation with respect to a surface of the geometric model, wherein the haptic end effector device is operatively connected to a haptic interface and the geometric model is stored in a memory of a computer system;

mapping the haptic end effector device position and orientation into a geometric model coordinate reference frame;

determining a closest point position and orientation on the surface of the geometric model to the haptic end effector device position;

determining a surface property at the closest point position and orientation; and mapping the surface properties into a vector representing position and orientation.

17. A method as set forth in claim 12 wherein said step of editing a non-fixed point includes the steps of:
- acquiring a haptic end effector device position and orientation with respect to a surface of the geometric model;
- mapping the haptic end effector device position and orientation into a geometric model coordinate reference frame;
- finding a new surface position using a previous closest point position and haptic end effector device position and orientation;
- determining surface properties at the closest point position and orientation; and
- mapping the surface properties into a vector representing position and orientation.

18. A method as set forth in claim 12 wherein said step of applying a stick-to-surface/stick-to-pen force and a property feedback force includes the step of tactilely conveying a surface property of the geometric model to a user through the haptic end effector device and constraining the haptic end effector device to the surface of the geometric model, and the surface of the geometric model to the haptic end effector device.

19. A method as set forth in claim 12 wherein the user views the surface of the geometric model using a virtual reality display mechanism in communication with the computer system and the haptic interface.

20. A method as set forth in claim 19 wherein the computer system, haptic interface and virtual reality display mechanism are in communication with each other.

* * * * *